United States Patent Office 3,113,936
Patented Dec. 10, 1963

3,113,936
FLUOROTHIACYL CHLORIDES AND POLYMERS THEREOF
William J. Middleton, Claymont, Del., assignor to E. I. du Pont de Nemours and Company, Wilmington, Del., a corporation of Delaware
No Drawing. Filed Aug. 17, 1959, Ser. No. 833,913
21 Claims. (Cl. 260—79)

This invention relates to, and has as its principal objects provision of, novel thiocarbonyl compounds containing both fluorine and chlorine, polymers of these compounds, and methods for the preparation of both the monomers and polymers.

In accordance with this invention, there are now provided fluorothioacyl chlorides of the formula $$X-R_f-CS-Cl$$

in which $R_f$ is perfluoroalkylene, preferably perfluoroalkylene having 1–10 carbon atoms, and X is fluorine, chlorine or hydrogen. There are also provided polymers of the novel fluorothioacyl chlorides. These polymers include the cyclic dimers as well as linear homopolymers and copolymers of these fluorothioacyl chlorides with other copolymerizable monomers. These polymers contain at least two recurring structural units of the formula

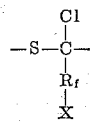

wherein X and $R_f$ have the meanings given above.

A general method for preparing the fluorothioacyl chlorides of this invention involves contacting a fluorochloroalkane of the formula $XR_fCY_2Cl$, wherein Y is chlorine, bromine or iodine, and X and $R_f$ have the meanings heretofore given, with sulfur at a temperature at which the sulfur is in vapor form. At atmospheric pressure the reaction temperature is about 445° C. Temperatures below 445° C. can be used provided the pressure under which the reaction is carried out is lowered. Likewise, temperatures above 445° C. can be used provided the reaction pressure is raised accordingly. The reaction is conveniently carried out in the presence of an inert gas, e.g., nitrogen, and the volatile fluorothioacyl chloride is removed from the reaction zone as soon as it is formed. It is conveniently collected in a receiver cooled below the boiling point of the fluorothioacyl chloride, e.g., in a trap cooled by a mixture of solid carbon dioxide and acetone.

One of the fluorothioacyl chlorides of this invention, i.e., trifluorothioacetyl chloride, can be prepared by contacting a chlorofluoroalkyl mercury compound of the formula $(CF_3CClZ)_2Hg$, where Z is bromine or chlorine, with hot liquid or vapor of sulfur. The reaction is illustrated by the following equation:

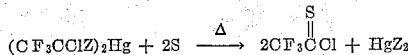

Preferably, the chlorofluoroalkyl mercury compound is introduced gradually into an excess of refluxing sulfur under a blanket of an inert gas, e.g., nitrogen, and the volatile fluorothioacyl chloride which is formed is collected in a receiver cooled to a temperature below the boiling point of the fluorothioacyl chloride, e.g., in a trap cooled by a mixture of solid carbon dioxide and acetone. The product isolated in the cold receiver can, if desired, be purified by fractional distillation.

The reaction is conveniently carried out at atmospheric pressure at the temperature of refluxing sulfur, i.e., 445° C. Higher temperatures, and correspondingly higher pressures, can be used as long as the temperature is below the decomposition temperature of the reactants or the products. Subatmospheric pressures, with correspondingly lower temperatures, can also be employed if desired. The reaction between the chlorofluoroalkyl mercury compound and the sulfur takes place rapidly and the fluorothioacyl chloride reaction product is removed from the reaction zone as it is formed.

The fluoroalkyl mercury compounds used in this process can be prepared by reaction of fluoroolefins of the formula $ZCCl=CF_2$, wherein Z is bromine or chlorine, with mercuric fluoride at an elevated temperature, e.g., 100° C., optionally in the presence of a solvent for the mercuric fluoride, e.g., hydrogen fluoride. The preparation of fluoroethyl mercury compounds of this type is described in U.S. Patent 2,844,614.

Another method for preparing the fluorothioacyl chlorides of this invention comprises the thermal decomposition of a chlorinated fluoroalkyl-1,3-dithietane as illustrated by the following equation:

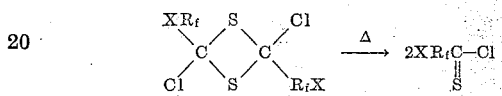

wherein X and $R_f$ have the meanings defined previously. This decomposition is generally effected at temperatures between 450° and 700° C. The reaction is readily carried out by introducing the dithietane at a low rate into a heated vessel, preferably a heated tube packed with an inert solid to effect uniform heat transfer, at reduced pressure. The fluorothioacyl chloride thus produced is of high purity and is isolated by passing the effluent reaction gases into a cold trap. The isolated product can be distilled if desired.

As indicated previously, the polymers of this invention include homopolymers of the fluorothioacyl chlorides and also copolymers of fluorothioacyl chlorides with other copolymerizable monomers. These polymers range from low molecular weight liquid polymers, i.e., dimers, trimers, and the like, to high molecular weight solid polymers.

The polymers of this invention are prepared by polymerizing monomeric fluorothioacyl chlorides of the formula $XR_fCSCl$ alone or in combination with one or more other copolymerizable monomers in the presence of an ionic initiator or in the presence of ultraviolet light.

The polymerization in the presence of an ionic initiator can be carried out at a temperature between 0° and −120° C. or lower in the presence of a solvent such as an ether, e.g., diethyl ether or tetrahydrofuran, or a hydrocarbon, e.g., pentane, that remains liquid at the operating temperature. The preferred temperature range for carrying out the polymerization is between −50° and −100° C. In this temperature range diethyl ether is a particularly effective solvent. Polymerization times range from a few minutes up to several days, e.g., 3–4 days, depending on the particular operating conditions and the particular fluorothioacyl chloride that is being polymerized.

A wide variety of ionic initiators can be used in this process. Specific initiators that are operable includes amides, e.g., dimethylformamide, and N-methylacetamide; primary, secondary and tertiary amines, e.g., triethylamine, diisopropylamine, N-methylmorpholine, tetrakis(dimethylamino)ethylene, and nitrosodimethylamine; phosphines, e.g., triphenylphosphine; quaternary ammonium chlorides having no hydrogen on the quaternary ammonium nitrogen, e.g., tetraethyl quaternary ammonium chloride; quaternary ammonium methoxide; alkali metal fluorides, e.g., cesium fluoride; and metal alkyls, e.g., butyl lithium. Anionic initiators, particularly dimethylformamide, are especially suitable for making high molecular weight polymers. The ionic initiators can be employed in concentrations ranging from about 0.2% to 20% of the weight of the monomers being polymerized.

The polymerization of the fluorothioacyl chlorides in the presence of ultraviolet light as the initiator is conveniently carried out in the presence of an inert solvent such as highly halogenated hydrocarbon, e.g., dichlorodifluoromethane. Any convenient source of ultraviolet light can be used. For example, any of the commercially available lamps that are relatively high in ultraviolet output are suitable. Generally speaking, mercury vapor arc lamps are preferred since they provide a relatively intense source of ultraviolet light. Many lamps of this type are available and they include low and high pressure lamps with various types of envelopes. The most preferred are those with quartz envelopes since such envelopes permit the higher percent transmission of ultraviolet light.

The temperature and pressure at which the polymerization in the presence of ultraviolet light is carried out are not critical. It is convenient to use room temperature and atmospheric pressure but lower or higher temperatures and lower or higher pressures can be used if desired. It is convenient to carry out the polymerization at the boiling point of the solvent being used. At ordinary temperatures and pressures the polymerization is substantially complete in about one hour. However, the polymerization can be continued for several hours, e.g., 6–8 hours, or even more, if desired.

As indicated above, the polymers of this invention include copolymers of fluorothioacyl chlorides with one or more other copolymerizable monomers. Preferably, the copolymers contain at least 5 mole percent of the fluorothioacyl chloride. Examples of typical copolymerizable monomers that can be used to prepare the polymers of this invention include ethylenically unsaturated compounds that undergo vinyl type polymerization, e.g., propylene, vinyl acetate, vinyl fluoride and tetrafluoroethylene; copolymerizable carbonyl and thiocarbonyl compounds, including thioacyl fluorides, e.g., thiocarbonyl difluoride, trifluorothioacetyl fluoride; fluorinated ketones, e.g., perfluorocyclobutanone; and fluorinated thioketones, e.g., perfluorothioacetone. These comonomers can be used in mixtures with fluorothioacyl chlorides in the desired proportions and the mixtures subjected to the polymerizing conditions described in the preceding paragraphs. Anionic initiators are especially effective in preparing the copolymers of this invention.

The products of this invention and their preparation are illustrated in further detail by the following examples.

EXAMPLE I

*Trifluorothioacetyl Chloride*

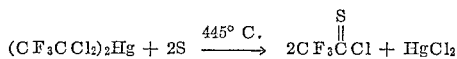

A reaction flask with two necks about 10″ long and 1″ in diameter containing 150 g. of sulfur is heated until the sulfur refluxes up the neck for about 4″. Through one of the necks 100 g. of bis(1,1-dichlorotrifluoroethyl) mercury is added portion-wise in a slow stream of nitrogen over a period of 30 minutes. The other neck of the flask is connected through an air condenser to a trap cooled by a mixture of solid carbon dioxide and acetone. After the addition is completed, the red condensate in the trap is distilled. There is obtained 21.7 g. of trifluorothioacetyl chloride as an intensely red liquid, B.P. 28–29° C.

*Analysis.*—Calc'd for $C_2ClF_3S$: C, 16.17%; Cl, 23.87%; F, 38.37%; S, 21.58%. Found: C, 16.11%; Cl, 24.79%; F, 38.37%; S, 21.65%.

The bis(1,1 - dichlorotrifluoroethyl)mercury used as starting material in Example I is prepared by heating a mixture of 1 mole of 1,1-dichlorodifluoroethylene and 0.5 mole of mercuric fluoride in the presence of anhydrous hydrogen fluoride in a pressure vessel for 12 hours at 100° C. The bis(1,1-dichlorotrifluoroethyl)mercury is obtained in the shape of fine, white needles, M.P. 180–185° C., on crystallization from chloroform.

*Analysis.*—Calc'd for $C_4F_6Cl_4Hg$: Cl, 28.10%. Found: Cl, 26.79%.

When bis(1-bromo-1-chlorotrifluoroethyl)mercury is reacted with sulfur under the conditions of Example I, trifluorothioacyl chloride is also obtained.

EXAMPLE II

*2-Chlorotetrafluorothiopropionyl Chloride*

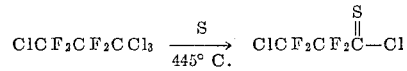

A reaction flask fitted with two necks about 10″ long and 1″ in diameter is charged with 100 g. of dry filtered sulfur. The flask is flushed with nitrogen and heated until the sulfur refluxes in the neck. There is then added 17 g. of 1,1,1,3-tetrachloro-2,2,3,3-tetrafluoropropane during 16 minutes. There is obtained 9.5 ml. of a deep rose-red liquid which on distillation yields 3 g. of an intense red liquid boiling at 85–93° C. and having a refractive index $n_D^{25}$ of 1.4117. This product has the expected nuclear magnetic resonance spectrum for 2-chlorotetrafluorothiopropionyl chloride.

When the particular fluorohaloalkane of Example II is replaced by the specific fluorohaloalkanes listed in column 1 of Table I and reacted with sulfur under the conditions of Example II, the specific fluorothioacyl chlorides listed in the second column of Table I are obtained.

TABLE I

| Fluorohaloalkane | Fluorothioacyl Chloride |
|---|---|
| $ClCF_2CF_2CF_2CCl_3$ | $ClCF_2CF_2CF_2C(S)-Cl$ |
| $HCF_2CF_2CCl_3$ | $HCF_2CF_2C(S)-Cl$ |
| $CF_2BrCCl_2Br$ | $BrCF_2C(S)-Cl$ |
| $CF_3CHCl_2$ | $CF_3C(S)-Cl$ |

EXAMPLE III

*Preparation of Trifluorothioacetyl Chloride Dimer*

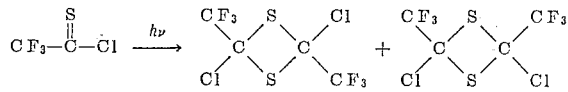

A solution of 8 g. of trifluorothioacetyl chloride in 25 ml. of difluorodichloromethane is irradiated with ultraviolet light for 2 hours. Most of the red color fades after 1 hour. At the completion of the 2-hour irradiation, the solvent is removed by evaporation and the residue is distilled under reduced pressure. There is obtained 7.38 g. of 2,4-dichloro-2,4-bis(trifluoromethyl)-1,3-dithietane as a colorless liquid, B.P. 66–68° C./25 mm., refractive index $n_D^{24}$ 1.4166. The nuclear magnetic resonance spectrum obtained on this product indicates it to be a mixture of the cis and trans isomers in the ratio of about 4:1.

*Analysis.*—Calc'd for $C_4Cl_2F_6S_2$: C, 16.17%; Cl, 23.87%; F, 38.37%; S, 21.65%. Found: C, 16.90%; Cl, 23.80%; F, 38.33%; S, 20.93%.

EXAMPLE IV

*Preparation of Poly (Trifluorothioacetyl Chloride)*

One drop of dimethylformamide is added to a dilute solution of about 1 g. of trifluorothioacetyl chloride in 10 ml. of diethyl ether cooled to −78° C. After 30 minutes the reaction mixture is allowed to warm to room temperature and the ether is evaporated. There is obtained as a residue a sticky semi-solid polymer of trifluorothioacetyl chloride. This polymer is effective as an adhesive for joining sheets of paper together.

EXAMPLE V

*Preparation of 2,4-Bis(Chlorodifluoromethyl)-2,4-Dichloro-1,3-Dithietane*

In a 250-ml. flask with two necks, each 15 cm. long, is placed 100 g. of sulfur. This is heated until it refluxes and 148 g. of 1,1-dichloro-2,2-difluoroethylene is passed into the reaction flask during the course of 2.75 hours. There is collected in a trap kept at room temperature, 130 g. of product. The low-boiling fraction obtained by distillation of the crude product is unreacted starting material and small amounts of product are collected along the way, but no flat is obtained until 73–75° C. at 10 mm., where 28.1 g. is collected, $n_D^{25}$ =1.4852. This is redistilled and 24.5 g. of 2,4-bis-(chlorodifluoromethyl) - 2,4 - dichloro - 1,3 - dithietane, boiling at 75–76° C./9 mm. is collected.

*Analysis.*—Calc'd for $C_4F_4Cl_4S_2$: C, 14.6%; F, 23.0%; Cl, 43.0%; S, 19.4%. Found: C, 14.6%; F, 23.2%; Cl, 43.0%; S, 19.6%.

EXAMPLE VI

*Preparation of Chlorodifluorothioacetyl Chloride*

A 2.5 cm. tube of the heat-resistant glass known commerically as "Vycor," packed for a length of 25 cm. with quartz rings, is connected to a trap cooled by solid carbon dioxide-acetone and the system is evacuated to 1 mm. Hg pressure with an oil pump. The packed tube is heated to 600° C. and 10 g. of 2,4-bis(chlorodifluoromethyl)-2,4-dichloro-1,3-dithietane is added dropwise over a period of 30 minutes. The red condensate in the trap is distilled under reduced pressure. There is obtained 8.1 g. of chlorodifluorothioacetyl chloride as a deep red liquid, B.P. ca. —10° C./20 mm., $n_D^{25}$ =1.4465

$$\lambda_{max}^{cyclohexane}\ 510\ m\mu\ (\epsilon=11.5)$$

*Analysis.*—Calc'd for $C_2Cl_2F_2S$: C, 14.56%; Cl, 42.98%; F, 23.03%; S, 19.40%. Found: C, 14.71%; Cl, 43.12%; F, 23.02%; S, 19.37%.

EXAMPLE VII

*Poly(Chlorodifluorothioacetyl Chloride)*

A solution of 4.0 g. of chlorodifluorothioacetyl chloride in 20 ml. of dry diethyl ether is cooled to —78° C., and one drop of dimethylformamide is added. The solution is allowed to remain at —78° C. for 4 hours. After this time, most of the red color has faded. Methanol is added to precipitate the polymer, and the polymer is washed with methanol and dried in vacuo. A tough, white, flexible film is pressed from the polymer at 80° C. and 10,000 lb./sq. in.

*Analysis.*—Calc'd for $(C_2Cl_2F_2S)_n$: C, 14.56%; Cl, 42.98%; F, 23.03%; S, 19.40%. Found: C, 14.92%; Cl, 42.97%; F, 23.79%; S, 19.79%.

The monomeric fluorothioacyl chlorides of this invention are useful in various applications. For example, they are particularly useful as insecticides and fumigants. For example, trifluorothioacetyl chloride is especially effective as a fumigant against ordinary houseflies. The monomeric fluorothioacyl chlorides are also chemically reactive. For example, they react with alcohols to form thiol esters.

The monomeric fluorothioacyl chlorides of this invention possess the outstanding advantage over the hitherto known thiocarbonyl compounds of being extremely stable to storage at room temperature in the absence of light. In contrast, thiobenzoyl chloride polymerizes on storage at room temperature. Polyfluorothioketones are stable at temperatures of about —80° C. for only short periods of time, and α-fluorothioacyl fluorides polymerize in a few days when stored at 25° C.

The polymeric fluorothioacyl chlorides of this invention are also useful in a variety of applications. The dimers are particularly useful as dielectric liquids and solvents for the higher molecular weight polymers. The dimers are also useful for thermal cracking to monomeric fluorothioacyl chlorides of high purity. The higher molecular weight polymers of fluorothioacyl chlorides are useful as adhesives and coating compositions. They are particularly useful as adhesives in joining sheets of paper together.

Still higher molecular weight polymers are useful in preparing molded objects and films that are resistant to hydrogen fluoride and to burning.

Since obvious modifications and equivalents in the invention will be evident to those skilled in the chemical arts, I propose to be bound solely by the appended claims.

The embodiments of the invention in which an exclusive property or privilege is claimed are defined as follows.

I claim:

1. A fluorothioacyl chloride of the formula

wherein $R_f$ is perfluoroalkylene of up to 10 carbons and X is a member of the group consisting of fluorine, chlorine and hydrogen.

2. Trifluorothioacetyl chloride.

3. Chlorodifluorothioacetyl chloride.

4. The process of preparing trifluorothioacetyl chloride which comprises reacting a precursor of the formula $(CF_3CClZ)_2Hg$, wherein Z is selected from the group consisting of bromine and chlorine, with sulfur at elevated temperature.

5. The process of preparing trifluorothioacetyl chloride which comprises reacting bis(1,1-dichlorotrifluoroethyl)-mercury with sulfur at elevated temperature.

6. The process of preparing a compound of claim 1 which comprises thermally decomposing a chlorinated fluoroalkyl-1,3-dithietane at elevated temperature.

7. The process of preparing chlorodifluorothioacetyl chloride which comprises thermally decomposing 2,4-bis(chlorodifluoromethyl) - 2,4 - dichloro - 1,3 - dithietane at elevated temperature.

8. A homopolymer of a compound of claim 1.

9. A solid, linear copolymer of a compound of claim 1 and at least one other copolymerizable monomer.

10. A dimer of a compound of claim 1.

11. Poly(trifluorothioacetyl chloride).

12. 2,4 - bis(trifluoromethyl) - 2,4 - dichloro - 1,3-dithietane.

13. Poly(chlorodifluorothioacetyl chloride).

14. The polymer of claim 8 in the form of a shaped structure.

15. The process of dimerizing a compound of claim 1 which comprises subjecting the same to ultraviolet irradiation.

16. The process of preparing 2,4-dichloro-2,4-bis(trifluoromethyl)-1,3-dithietane which comprises subjecting trifluorothioacetyl chloride to ultraviolet irradiation.

17. The process of preparing a linear polymer of a compound of claim 1 which comprises contacting said compound in a liquid solvent with an ionic initiator at a temperature of between about 0 and —120° C.

18. The process of claim 17 accomplished in the presence of a second copolymerizable monomer.

19. The process of polymerizing trifluorothioacetyl chloride which comprises contacting the same in a liquid solvent with an ionic initiator at a temperature of about 0 to —120° C.

20. The process of polymerizing chlorodifluorothioacetyl chloride which comprises contacting the same in a liquid solvent with an ionic initiator at a temperature of about 0 to —120° C.

21. A self-supporting film formed from poly(chlorodifluorothioacetyl chloride).

References Cited in the file of this patent

UNITED STATES PATENTS

| | | |
|---|---|---|
| 2,480,467 | Haworth et al. | Aug. 30, 1949 |
| 2,647,108 | Waters et al. | July 28, 1953 |
| 2,720,509 | Cushing | Oct. 11, 1955 |
| 2,851,407 | Nickerson | Sept. 9, 1958 |
| 2,861,103 | Lukes et al. | Nov. 18, 1958 |
| 2,884,453 | Tullock | Apr. 28, 1959 |
| 2,900,392 | Remes et al. | Aug. 18, 1959 |
| 2,905,696 | Fields | Sept. 22, 1959 |
| 2,912,373 | Carlson | Nov. 10, 1959 |

OTHER REFERENCES

Chemical Abstracts, vol. 30, page 693, abstracting Delepine et al., Bull. Soc. Chim., 512, 1969–80 (1935).